United States Patent [19]

Hollowell

[11] 4,082,353
[45] Apr. 4, 1978

[54] PAWL SEAT BACK LATCH MECHANISM

[75] Inventor: William M. Hollowell, Pacific Palisades, Calif.

[73] Assignee: American Safety Equipment Corporation, Encino, Calif.

[21] Appl. No.: 750,181

[22] Filed: Dec. 13, 1976

[51] Int. Cl.² .............................................. A47C 3/00
[52] U.S. Cl. .................................... 297/379; 297/316
[58] Field of Search .................. 297/216, 378, 379; 16/146, 139; 292/DIG. 22

[56] References Cited

U.S. PATENT DOCUMENTS

| 2,737,229 | 3/1956 | Semar | 297/379 |
| 2,873,794 | 2/1959 | Leslie et al. | 297/379 |
| 3,549,202 | 12/1970 | Boschen et al. | 297/379 |
| 3,628,831 | 12/1971 | Close | 297/379 |
| 3,674,309 | 7/1972 | Fowler | 297/379 |
| 3,900,225 | 8/1975 | Wirtz et al. | 16/146 X |

Primary Examiner—Roy D. Frazier
Assistant Examiner—William E. Lyddane
Attorney, Agent, or Firm—Poms, Smith, Lande & Glenny

[57] ABSTRACT

An inertia-responsive vehicle seat back latch mechanism for a vehicle seat assembly having a seat back pivotally supported for forwardly tilting movement, wherein said latch mechanism includes a seat back stud for moving with the seat back, a locking pawl pivotally attached to the seat cushion support which is adapted to engage the seat back stud, and a latching pawl pivotally attached to the seat cushion support for preventing the rotation of the locking pawl. The locking pawl is disposed to engage the seat back stud but is cammable free of the seat back stud thereby allowing forward tilting of the seat back; however, during a vehicle deceleration greater than a predetermined value, the latching pawl will prevent rotation of the locking pawl and thereby the locking pawl will lockingly engage the seat back stud thereby preventing forward tilting of the seat back.

4 Claims, 5 Drawing Figures

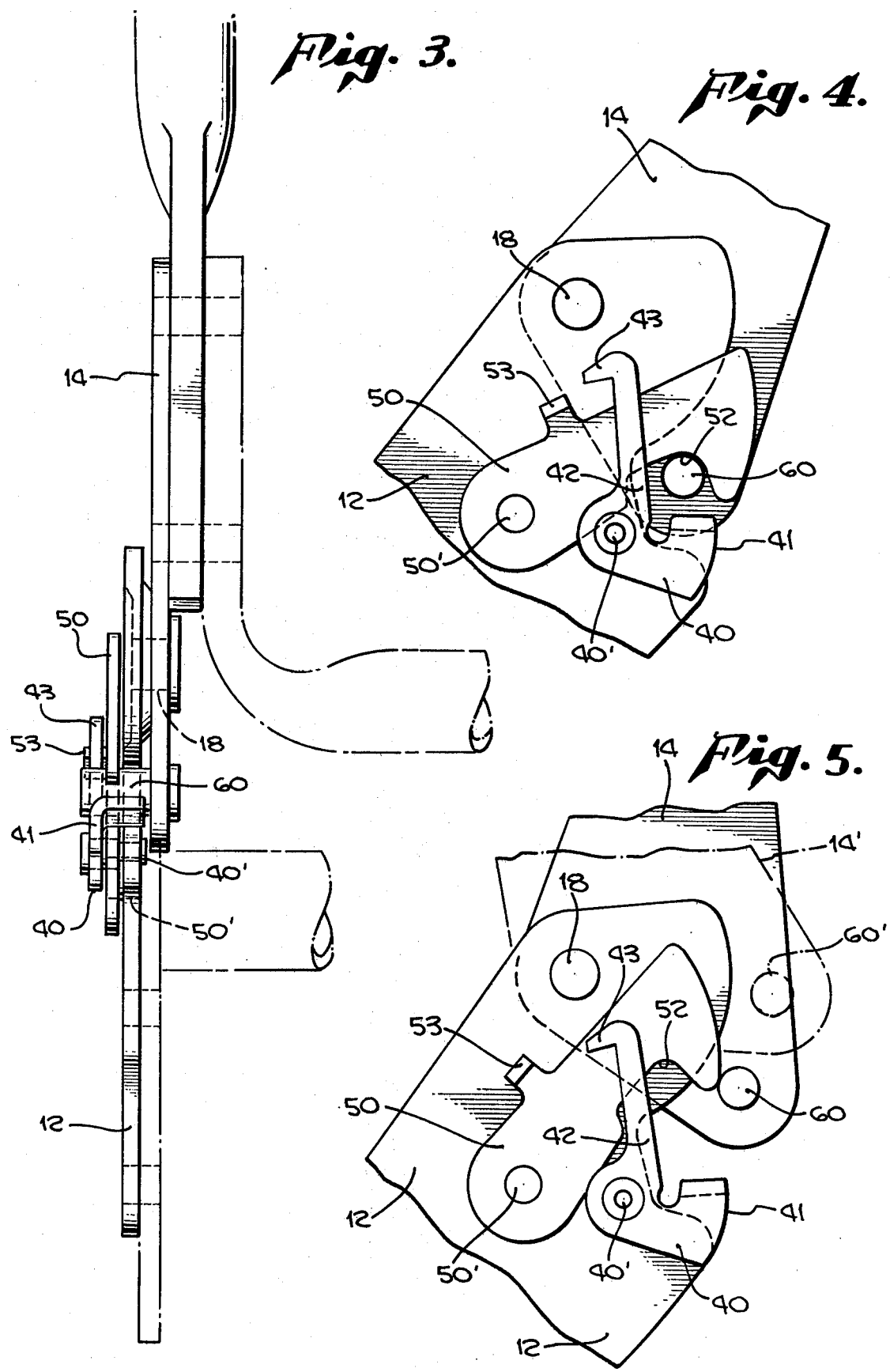

PAWL SEAT BACK LATCH MECHANISM

BACKGROUND OF THE INVENTION

1. Field of the Invention

This invention relates to vehicle seat back latch mechanisms, and more particularly to inertia-responsive vehicle seat back latch mechanisms.

2. Description of the Prior Art

The prior art discloses the exploitation of inertia and gravity to provide latching mechanisms for vehicle seat backs. However, none of these prior art mechanisms employs a means for locking the seat back which is sensitive both to vehicle inertia and to the inertia of the seat back in the manner described in this invention.

It is therefore a primary object of this invention to provide a new inertia-responsive seat back latch mechanism.

It is also an object of this invention to provide a new inertia-responsive seat back latch mechanism which is responsive both to vehicle inertia and to the inertia of the seat back.

SUMMARY OF THE INVENTION

Briefly, these and other objects of the invention are provided for by an inertia-responsive vehicle seat back latch mechanism for a vehicle seat assembly having a seat back pivotally supported for forwardly tilted movement, said latch mechanism locking said seat back in a locked condition during a vehicle deceleration wherein the latch mechanism includes a first means integrally attached to said seat back for moving with said seat back, and a second means for engaging said first means, said second means being cammable free of said first means during a vehicle deceleration up to a first predetermined value, and said second means lockingly engagable by said first means during a vehicle deceleration greater than said first value so that said seat back is prevented from tilting forward. The second means is normally disposed to be engaged by said first means attached to the seat back, and because the second means is inertia-responsive, an amount of time is necessary to enable the second means to become cammable free of said first means. This results in preventing the seat back from being tilted forward at an angular velocity greater than a first predetermined value dependent on the specific structure of the latch mechanism. This feature of this invention is highly desirable to prevent seat back rebound which results from the delayed reaction of a seat back to fly forward after the deceleration of the vehicle has ceased. This phenomenon results in serious passenger injuries notwithstanding the presence of conventional seat back latch mechanisms.

These and other objects and features of this invention will become apparent to those skilled in the art by reference to the following description and drawings.

BRIEF DESCRIPTION OF THE DRAWINGS

FIG. 3 is a back-elevational view of the seat back latch mechanism of FIG. 2 taken along the line III—III;

FIG. 4 is a partial, side-elevational view of the seat back latch mechanism of FIG. 2 illustrating the operation of the seat back latch mechanism; and FIG. 5 is a partial, side-elevational view of the seat back latch mechanism of FIG. 2 showing the release of the seat back by the seat back latch mechanism.

DETAILED DESCRIPTION OF THE INVENTION

Figure 1:
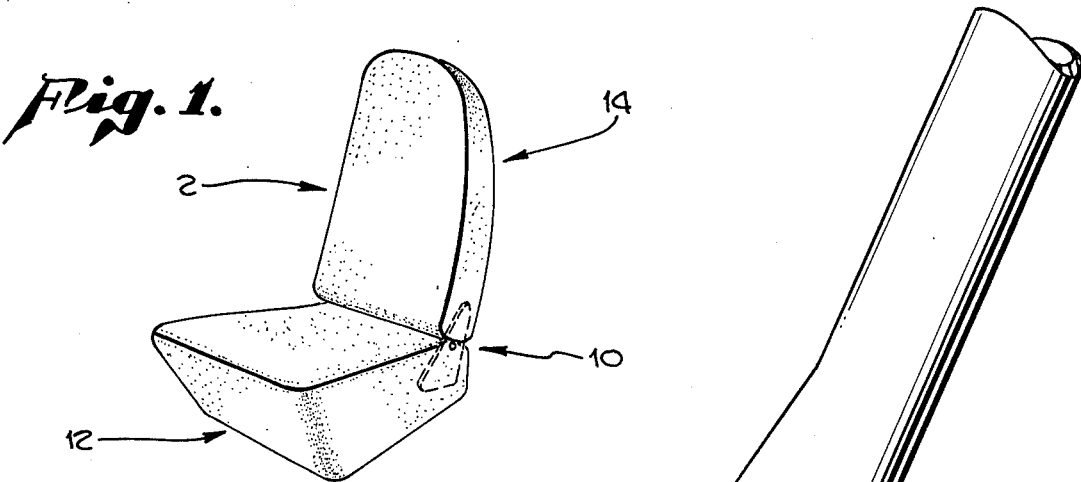
FIG. 1 is a perspective view of a vehicle seat assembly.
Figure 2:
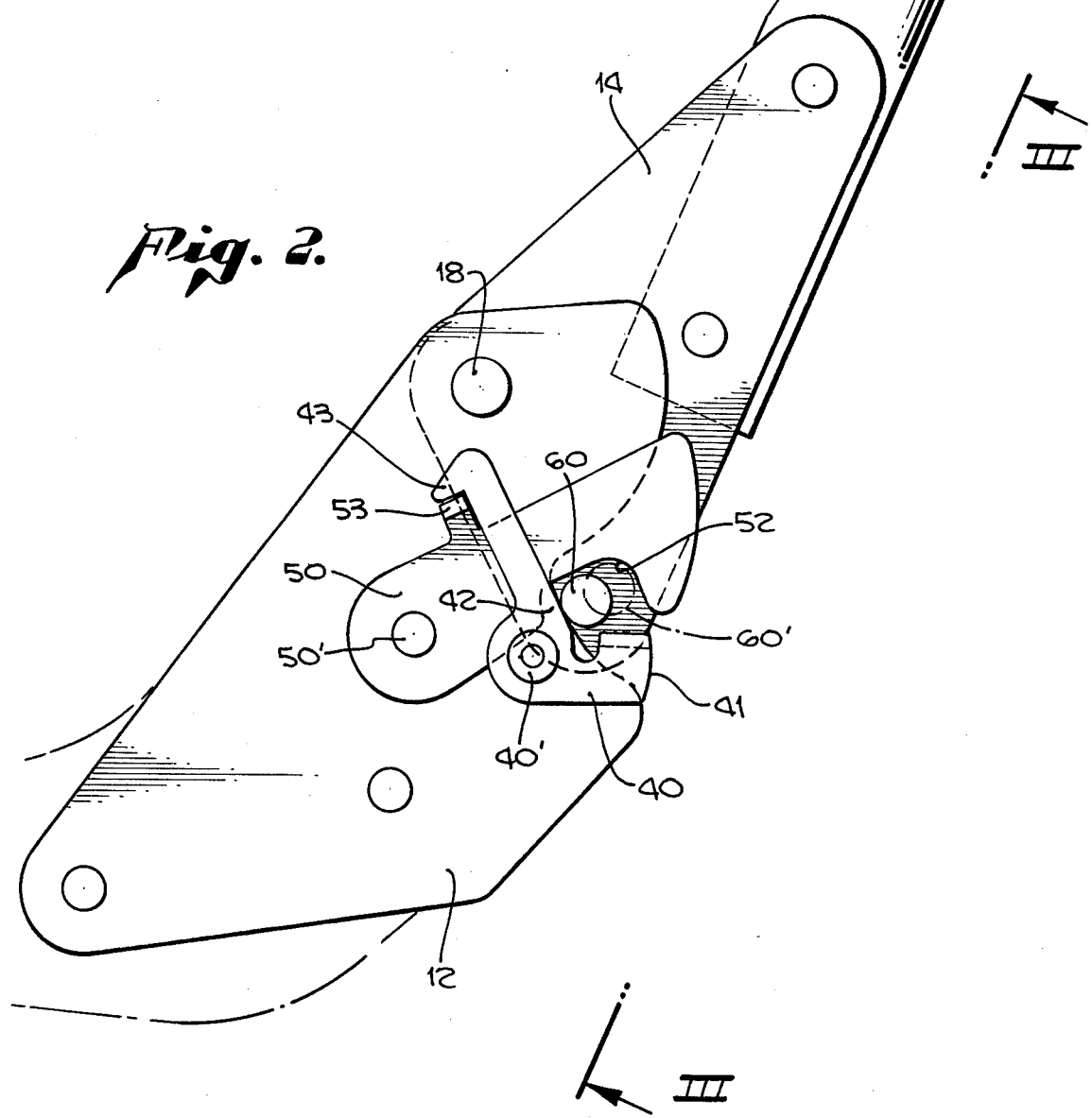
FIG. 2 is a partial, side-elevational view showing the preferred embodiment of the seat back latch mechanism of this invention.

Referring now to FIG. 1 of the drawings, there is shown a vehicle seat assembly 2, having a seat back 14 covered by upholstery and a seat cushion support 12, also covered by upholstery. There is also generally shown a seat back latch mechanism 10. The seat back latch mechanism of this invention may be used on bucket seats as shown in FIG. 1, as well as with bench-type seats, and may be structurally positioned on the outer edges of a seat assembly or positioned in the middle sections of a seat assembly. Referring now to both FIG. 1 and FIG. 2, seat back 14 is pivotally supported about the seat cushion support 12 by means of seat back pivot 18. Seat back 14 is adapted to normally be in a relatively vertical position, as shown in FIG. 1. Also attached to seat cushion support 12 is locking pawl 50 which is pivotally attached to seat cushion support 12 by locking pawl pivot 50'. There is also provided latching pawl 40 which is pivotally attached to seat cushion support 12 by latching pawl pivot 40'. Seat back 14 is provided with seat back stud 60 which extends horizontally from said seat back and is adapted to rotate with said seat back.

In this preferred embodiment, latching pawl 40 is provided with a weighted portion 41 and a latching portion 43. In this embodiment stud 60 is adapted to engage latching pawl 40 when seat back 14 is in its normal upright position such tht latching pawl 40 is restrained from moving in a clockwise direction. Due to weighted portion 41 of latching pawl 40, latching pawl 40 is gravity-biased in a clockwise direction but is restrained in its movement by stud 60. Locking pawl 50 is also gravity-biased, due to its structure, in a clockwise direction. Locking pawl 50 is provided with a locking pawl extension 53 which is adapted to be engaged by latching portion 43 of latching pawl 40. When latching pawl 40 is in the position shown in FIG. 2 wherein latching portion 43 engages locking pawl extension 53, locking pawl 50 is restrained from any counterclockwise movement. Locking pawl 50 is also provided with portion 52 which serves two functions; namely, (1) to provide a camming surface for stud 60 to allow locking pawl 50 to be cammed in a counterclockwise direction when latching portion 43 does not engage locking pawl extension 53, and (2) to block stud 60 and thereby prevent forward tilting of seat back 14 when latching portion 43 restrains and engages locking pawl extension 53.

Referring now to FIG. 4 and FIG. 5 which illustrate the operation of the seat back latch mechanism, during conditions of constant vehicle velocity, seat back 14 can be tilted forward without being restricted. As seat back 14 is tilted forward stud 60 moves away from portion 42 of the latching pawl 40, thereby allowing latching pawl 40 to rotate clockwise in response to the gravity-bias produced by weighted portion 41. As latching pawl 40 rotates clockwise, latching portion 43 is disengaged from locking pawl extension 53. As seat back 14 is further tilted forward stud 60 comes into contact with camming portion 52 of locking pawl 50. Due to the construction of the camming portion 52, stud 60 cams locking pawl 50 in a counterclockwise direction and allows the seat back 14 to be tilted completely forward as shown in FIG. 5. When seat back 14 is returned to its original, relatively upright position, this process is reversed and stud 60 again moves under camming portion 52 of locking pawl 50 and continues down until it contacts portion 42 of latching pawl 40 to force latching pawl 40 in a counterclockwise direction so that latching portion 43 again engages locking pawl extension 53.

If seat back 14 is attempted to be rotated forward during a vehicle deceleration greater than a predetermined value, stud 60 will again rotate into contact with camming portion 52 of latching pawl 50; however, due to inertia, latching pawl 40 will not rotate clockwise and therefore latching portion 43 will continue to engage locking pawl extension 53 and thereby restrain locking pawl 50 from being cammed out of position by stud 60. The position of stud 60 when it abuts locking pawl 50 under these conditions is shown as dotted lines 60' in FIG. 2. This will result in seat back 14 being locked and restrained from tilting forward.

Seat back 14 may also be placed in a locked condition under another set of conditions. Should seat back 14 be moved forward at an angular velocity such that stud 60 comes into engagement with camming portion 52 before latching pawl 40 has had sufficient time to rotate its latching portion 43 out of engagement with locking pawl extension 53, then stud 60 will prevent latching pawl 40 from rotating out of position via the force exerted by locking pawl extension 53 against latching portion 43. This force results from stud 60 pushing against camming portion 52 and attempting to push locking pawl 50 in a counterclockwise direction.

In view of the above, it is seen that seat back 14 is placed in a locked condition preventing tilting of said seat back during vehicle decelerations and also when seat back 14 is tilted forward at an angular velocity greater than a predetermined value of angular velocity. This feature of the invention will prevent seat back rebound.

While there have been shown and described what is at present considered to be the preferred embodiment of the invention, it is obvious for those skilled in the art that various changes and modifications can be made therein without departing from the invention as defined by the appended claims.

I claim:

1. An inertia-responsive vehicle seat back latch mechanism for a vehicle seat assembly having a seat cushion support, and a seat back pivotally supported for forwardly tilting movement, said latch mechanism comprising:
   first means integrally attached to said seat back for moving with said seat back; and
   second means attached to said seat cushion support for being cammed free by said first means during a vehicle deceleration up to a first predetermined value, and said second means including means for lockingly engaging said first means during a vehicle deceleration greater than said first value so that said seat back is prevented from tilting forward.

2. An inertia-responsive vehicle seat back latch mechanism for a vehicle seat assembly having a seat cushion support, a seat back pivotally supported for forwardly tilting movement, said latch mechanism comprising:
   first means integrally attached to said seat back for moving with said seat back;
   second means attached to said seat cushion support for engaging said first means and for normally being disposed to be so engaged, said second means including means for being cammed free by said first means during a vehicle deceleration up to a first predetermined value, and said second means including means for lockingly engaging said first means during a vehicle deceleration greater than said first value so that said seat back is prevented from tilting forward; and
   third means for allowing said second means to be cammed free by said first means during a vehicle deceleration up to said first predetermined value, and for not allowing said second means to be cammed free by said first means during a vehicle deceleration greater than said first value so that said second means lockingly engages said first means so that said seat back is prevented from tilting forward.

3. An inertia-responsive vehicle seat back latch mechanism for a vehicle seat assembly having a seat cushion support, seat back pivotally supported for forwardly tilting movement, said latch mechanism comprising:
   a stud integrally attached to said seat back and adapted to engage a locking pawl;
   a locking pawl pivotally attached to said seat cushion support and adapted and disposed to be engaged by said stud so as to be rotatably cammed by said stud to free said stud so as to allow said seat back to be tilted forward; and
   an inertia-responsive latching pawl pivotally attached to said seat cushion support, adapted to latch said locking pawl, and movable between a latching position, wherein said latching pawl latches the locking pawl to prevent the locking pawl from being rotatably cammed thereby preventing the seat back from tilting forward, and a tilting position, wherein said latching pawl allows the locking pawl to be rotatably cammed and thereby allowing the seat back to be tilted forward, said latching pawl being gravity biased to the tilting position, and being disposed during a vehicle deceleration greater than a first predetermined value in the latching position.

4. The latch mechanism defined in claim 3 wherein said stud is adapted to engage said latching pawl when said seat back is in its untilted position, so that the latching pawl is disposed in the latching position.

* * * * *